United States Patent [19]
Englisch

[11] Patent Number: 5,766,107
[45] Date of Patent: Jun. 16, 1998

[54] CONTINUOUS HYDROSTATIC POWER DIVISION TRANSMISSION

[75] Inventor: Andreas Englisch, Zöschingen, Germany

[73] Assignee: J.M. Voith GmbH, Heidenheim, Germany

[21] Appl. No.: 505,170

[22] PCT Filed: Dec. 16, 1994

[86] PCT No.: PCT/EP94/04184

§ 371 Date: Aug. 13, 1996

§ 102(e) Date: Aug. 13, 1996

[87] PCT Pub. No.: WO95/16868

PCT Pub. Date: Jun. 22, 1995

[30] Foreign Application Priority Data

Dec. 18, 1993 [DE] Germany ............... 43 43 402.9

[51] Int. Cl.[6] ............................................. F16H 47/04
[52] U.S. Cl. .................. 475/80; 475/82; 74/730.1; 60/490
[58] Field of Search ........................... 475/72, 80, 81, 475/82, 83; 74/606 R, 730.1; 60/487, 490

[56] References Cited

U.S. PATENT DOCUMENTS

| | | | |
|---|---|---|---|
| 3,052,098 | 9/1962 | Ebert | 60/53 |
| 3,969,958 | 7/1976 | Miyao et al. | 475/82 |
| 4,286,477 | 9/1981 | Meyerle et al. | 475/82 |
| 4,313,351 | 2/1982 | Hagin | 74/687 |
| 4,382,392 | 5/1983 | Meyerle et al. | 475/81 |
| 4,825,772 | 5/1989 | Hagin et al. | 74/687 |
| 4,972,675 | 11/1990 | Kawahara et al. | 60/487 X |
| 4,976,665 | 12/1990 | Hagin et al. | 475/80 |
| 5,071,391 | 12/1991 | Kita | 475/80 |
| 5,125,291 | 6/1992 | Makita et al. | 74/730.1 |
| 5,542,307 | 8/1996 | Hasegawa et al. | 74/730.1 X |
| 5,584,772 | 12/1996 | Hayd | 475/80 X |

FOREIGN PATENT DOCUMENTS

| | | |
|---|---|---|
| 450 282 A2 | 10/1991 | European Pat. Off. |
| 28 10 086 | 9/1979 | Germany |
| 29 04 572 C2 | 8/1980 | Germany |
| 36 24 989 C2 | 2/1988 | Germany |

OTHER PUBLICATIONS

International Search Report, International Application No. PCT/EP/94/04184.

*Primary Examiner*—Khoi Q. Ta
*Assistant Examiner*—Peter T. Kwon
*Attorney, Agent, or Firm*—Marshall, O'Toole, Gerstein, Murray & Borun

[57] ABSTRACT

A continuous hydrostatic-mechanical power division transmission has at least two operating ranges between which it is switched by shift elements, with a first, mechanical part (II) including a planetary differential gear (13) and a second, hydrostatic part (I) including two power-linked adjustable hydraulic units (H1 and H2) which can be operated in both directions either as a pump or as a motor and which are coupled to the mechanical part (II). An annulus (19) of a planetary differential (13) is used to control the direction and speed of rotation of a gear box output shaft (12) in the individual operating ranges and is coupled to the first hydraulic unit (H1). In a first operating range, the second hydraulic unit (H2) drives via a gear-shift element (K1, K2) to the output shaft (12). The first hydraulic unit (H1) coupled to the annulus (19) works as a pump while the second hydraulic unit (H2) works as a motor. The hydraulic units (H1, H2) are inclined-axis units with respective input and output shafts (27, 41) parallel to each other. Both hydraulic units (H1, H2) are mounted inside the gearbox casing and next to each other so that their respective input and output shafts (27, 41) are oriented in opposite directions and staggered by at most the length of a hydraulic unit with respect to each other in the direction of the axes of symmetry of the input and output shafts; the axes of the cylinders of the hydraulic units are disposed in the same plane; and at least one additional spur pinion stage is fitted between the planetary differential (13) and the second hydraulic unit (H2).

13 Claims, 8 Drawing Sheets

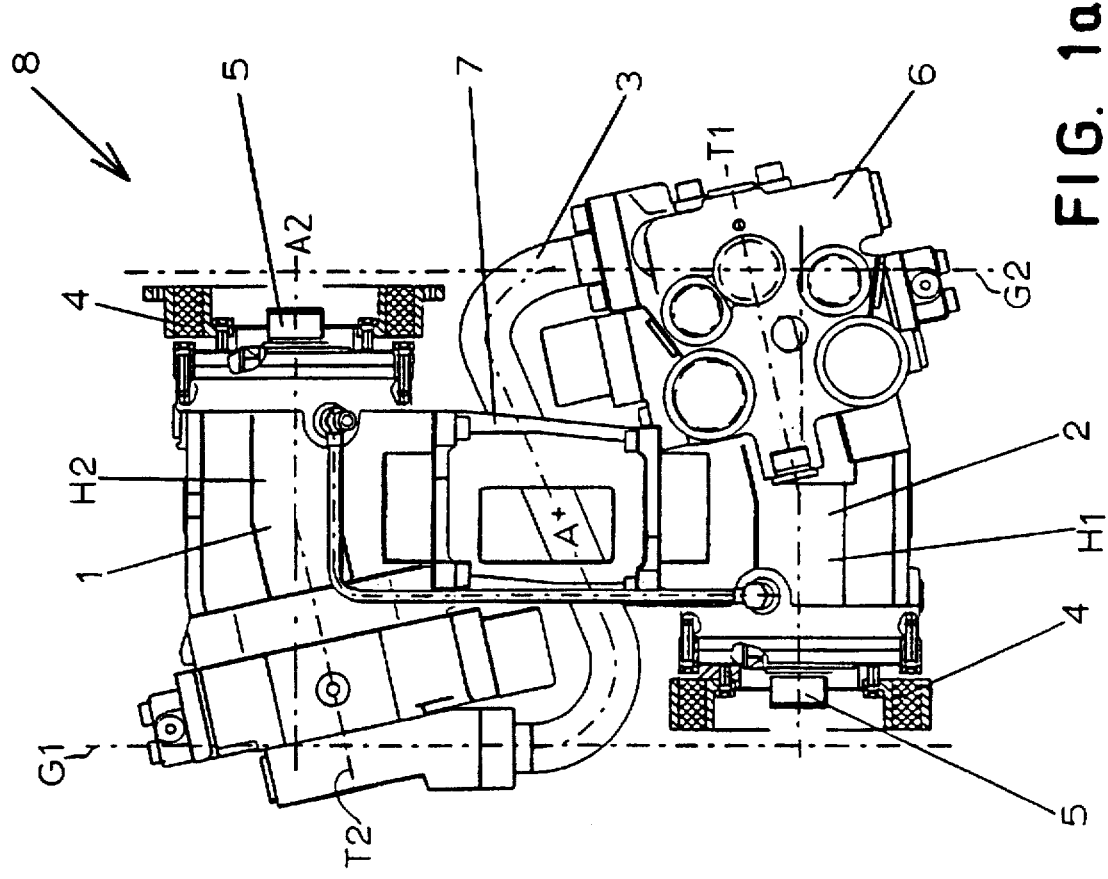
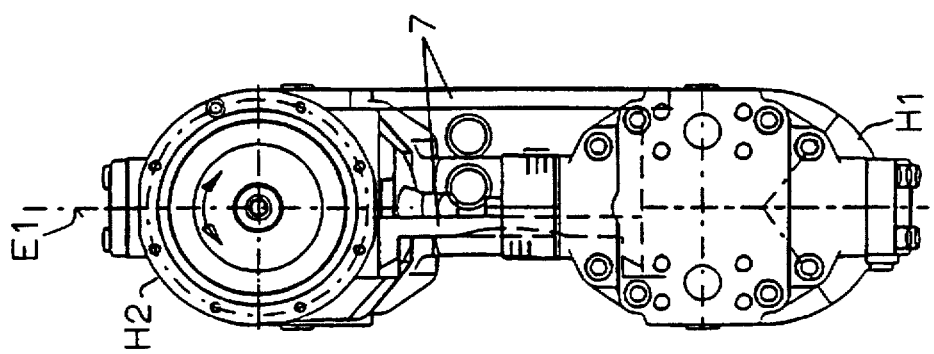
FIG. 1a
FIG. 1b

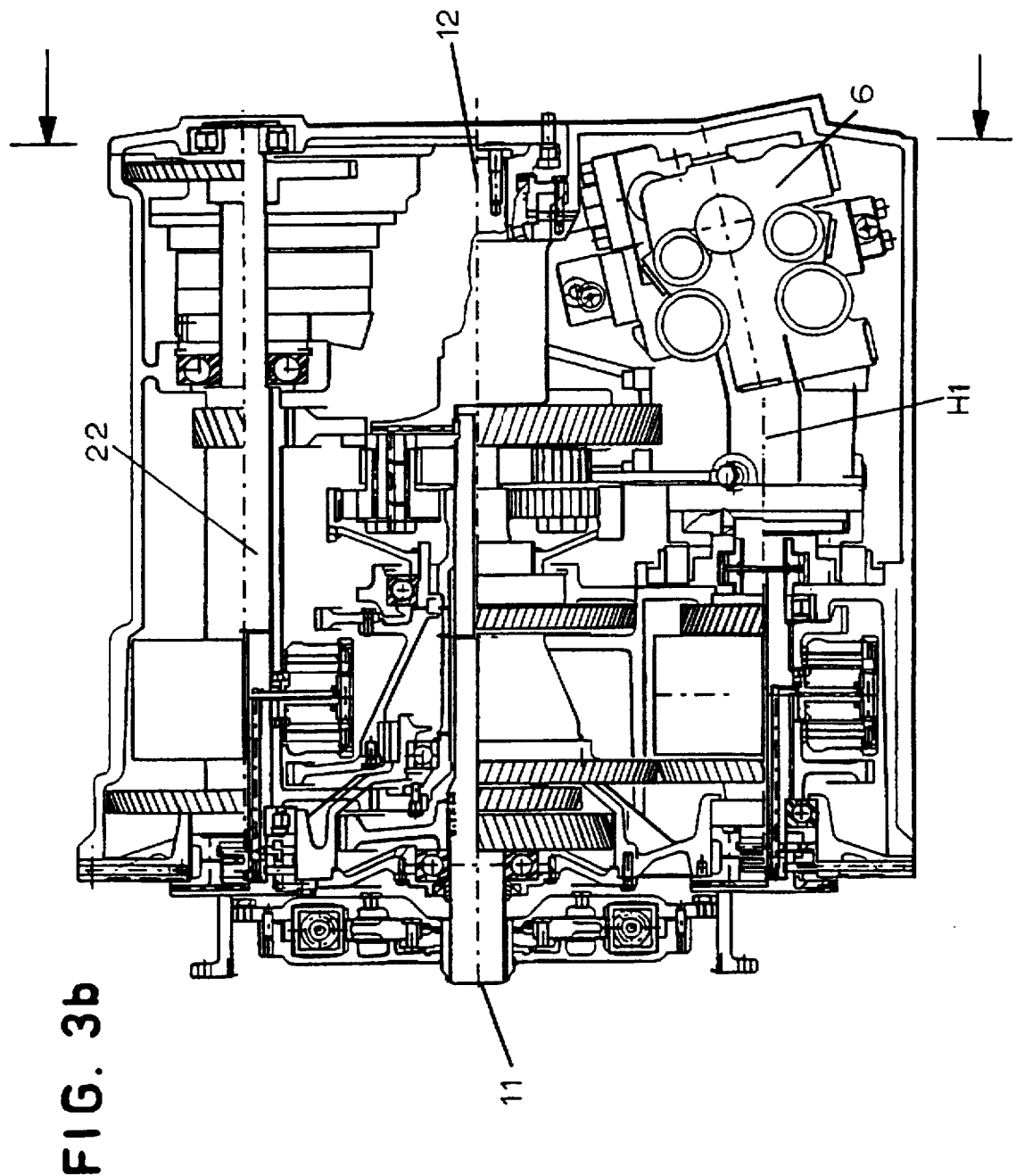

CONTINUOUS HYDROSTATIC POWER DIVISION TRANSMISSION

BACKGROUND OF THE INVENTION

1. Field of the Invention

The invention relates to continuous hydrostatic power division transmissions, and in particular to a hydrostatic transmission part of such a transmission.

2. Description of Related Technology

Continuous hydrostatic power division transmissions, abbreviated herein as CHP, make it possible to change speed without interruption of tensile force, with synchronous rpm, and without load. The principle and the structure of continuous hydrostatic power division transmissions are known, for example, from the following publications:

1) DE 28 10 086; and
2) DE 29 045 72 C2.

Such transmissions include hydrostatic and mechanical transmission portions which are coupled to each other in such a way that the power to be transmitted is transmitted to certain parts in the individual driving regions hydraulically and/or mechanically. The power division makes it possible to improve efficiency in comparison to a purely mechanical or a purely hydrostatic transmission. Both hydrostatic units can be driven as a pump and as a motor.

The transmissions that have thus far been realized in the art which are based on conventional solutions for use in passenger cars and heavy vehicles, have significantly larger dimensions and a correspondingly increased weight, and are less cost-effective in comparison to automatic torque converter transmissions.

Based on favorable characteristics, for example, a high start-up torque, better insensitivity of the system, a larger control range in variable displacement motors, significantly higher efficiency, as well as the possibility of higher limiting rpm and speed increasing ratios, the two hydrounits are designed as slanted axis units which can be operated as a pump and as a motor. However, the large dimensions and high noise level that generally characterize hydrostatic transmissions may be problematic.

Furthermore, integration of a slanted-axis hydrostat into a CHP transmission concept has not been possible so far in such a way that optimum arrangement of the other components could be achieved with a tolerable manufacturing cost. In general, in the conventional solutions, the hydrostatic units are flanged outside of the transmission housing of the mechanical transmission part, i.e., all parts that carry high pressure are disposed outside the transmission housing. Optimization of the constructional size of the hydrostat has not been possible since back gear transmissions have been limited by the distance between the axles and the shaft diameter. Also, the start-up pulling force was the essential design criterion for the hydrounits to be used. The realization of a marketable transmission regarding the size of the structure and its cost has thus so far had limited possibilities.

In a device disclosed in DE 36 24 989 C2 wherein two hydrounits are used as premounted units with a connecting or control block, the transmission design is very compact.

The hydrostats are disposed in the inner casing of the planetary gear and the control heads of the hydrostats are disposed against each other at such an angle that their ends almost touch and extend tangentially to the envelope toward the top and bottom. As a result, the space required by the structure is minimized. Disadvantages of such an arrangement consist above all in increased manufacturing costs for the control block and realization of energy coupling of the hydrounits based on the angled orientation of the control heads, and thus in providing a flange designed for this; furthermore, it is not possible to reduce the size of the hydrounits.

SUMMARY OF THE INVENTION

It is an object of the invention to overcome one or more of the problems described above. It is also an object of the invention to further develop a CHP unit of the type described in the background section herein in such a way that a transmission can be produced which is marketable from the point of view of size and cost. It is also an object of the invention that the dimensions and the weight of the transmission can be reduced using commercial hydrostatic components to the extent that these reach the magnitude of transmissions that are on the market today, for example, of torque converter transmissions, without having to consider the technical disadvantages. At the same time, it is of enormous importance for the use of CHP transmissions in passenger vehicles and in the heavy vehicle area to acoustically decouple two hydrounits from the housing in order to reduce the noise level as much as possible, the noise being caused mainly by the hydrostatic part of the transmission.

According to the invention, a continuous hydrostatic-mechanical power division transmission has a mechanical transmission part and a hydrostatic transmission part. The mechanical transmission part includes a planetary differential transmission having at least two sun wheels of different diameters, a hollow wheel, and a bridge shaft upon which nonrotatingly connected double planet wheels are disposed, the double planet wheels meshing with the sun wheels, the large sun wheel being connected to a transmission input shaft, and the bridge shaft being connected to a transmission output shaft.

The hydrostatic transmission part includes first and second displaceable hydrounits energetically coupled with each other, each having a driving/driven shaft and being operable in two directions, as both a pump and as a motor. The hydrounits are coupled to the mechanical transmission part.

In individual operating regions, the hollow wheel is coupled to the first hydrounit to control the direction of rotation and the rate of rotation of the transmission output shaft. In a first operating range, the second hydrounit is in drive connection with the transmission output shaft through a change-over element and the first hydrounit which is connected to the hollow wheel operates as a pump and the second hydrounit operates as a motor. Furthermore, the hydrounits are disposed in a slanting axis construction and the driving/driven shaft of the hydrounits run parallel to one another. Both hydrounits are disposed within a transmission housing. At least one control block is assigned to the hydrounits to assume valve functions.

According to the invention, the two hydrounits are disposed next to one another in such a way that their driving/driven shafts are directed opposite to one another and are displaced with respect to one another in the direction of an axes of symmetry of the driving/driven shafts of the hydrounits by a maximum amount which corresponds to the length of one hydrounit. The drum axis of each of the hydrounits are disposed in the same plane. Furthermore, at least one additional spur pinion stage is provided between the planetary differential transmission and the second hydrounit.

By disposing two hydrostatic units with their axes slanted and next to one another in such a way that their driving and driven shafts (depending on whether operated as a pump or as a motor) have parallel axes, but are oppositely oriented and displaced with respect to one another a maximum distance of the length of one hydrounit in a direction of the axis of symmetry of the driving shaft or driven shaft of one of each of the hydrounits, so that the drum axes are disposed in a plane, there is a possibility of integration of the hydrounits together with the mechanical transmission part in a common transmission housing, preferably above and below the mechanical transmission part in fitting position. A sideways arrangement, i.e., one according to the invention, in the vertical direction or fitting position, can also be considered if the oil sump is displaced. The hydrostatic transmission part can be disposed in the region of the mechanical transmission part without increasing the dimensions of the entire transmission with respect to the purely mechanical part of the transmission. In order to keep the dimensions of the entire assembly as small as possible, the slanted-axis hydrostats are preferably oriented with respect to one another in such a way that the drums of the hydrounits are directed toward one another in a moved-out state.

The extensions of the axes of symmetry of the driving and driven shafts of each hydrounit and straight lines drawn through the intersections of the outside contours of one of each hydrounit with the symmetry axes describe a parallelogram. The energy coupling of the two hydrounits is done via tubings which are disposed between the two hydrounits in such a way that these essentially describe a diagonal of the parallelogram.

The integration of the hydrounits with the mechanical part of the transmission in a common transmission housing allows creation of a transmission in a compact form into which even the high-pressure parts of the hydrostatic part of the transmission are integrated, so that, in case of leakage, no oil can escape to the outside.

Providing at least one additional intermediate shaft makes it possible to increase the start-up speed increase ratio of a hydrounit, and thus the use of smaller hydrostats, as a result of which, in the final analysis, the dimensions thereof can be adapted better to the entire transmission concept. Furthermore, as a result of the speed increase ratios, the same hydrounits can be used in the structure and in the design. When using different hydrounits, the jump in structure size can be reduced considerably.

Preferably, slanted-axis-built hydrounits of the same series can be used as hydrounits, i.e., the same hydrounits with regard to structure, size and design. The placement of the second hydrounit next to the first hydrounit is accomplished in such a way that an axis is present between the two hydrounits, with reference to which the two hydrounits are oriented with respect to one another with axial symmetry. The position of the second hydrounit is obtained by rotation of 180° around this axis, which is directed perpendicularly to one of the planes defined by the axis of symmetry of the driving and driven shafts of the hydrounits. The position of the axis is chosen in such a way that the two hydrounits are disposed directly next to one another without any significant displacement in the direction of the axes of symmetry. In such an embodiment, the extension of the axes of symmetry of the driving shaft and driven shaft of each hydrounit and the straight lines laid through the intersections of the outside contours of the hydrounits with the extended symmetry axis define a rectangle. The hydraulic connecting lines, preferably designed in the form of tubes, are disposed between the two hydrounits and essentially define a diagonal of the rectangle. In connection with a transverse bar or connecting lines disposed between the two hydrounits, the two hydrounits always describe a letter Z and therefore this arrangement can also be called a Z arrangement. The two hydrounits are disposed parallel to one another but reversed right-to-left with respect to one another. An especially positive aspect of this embodiment is that this arrangement requires the least constructional space in the entire transmission in comparison to transmission arrangements of the conventional design, and thus the possibility of building a very compact total transmission is created.

Based on the orientation of the driving and driven shafts of the individual hydrostats and their drum axes in a common plane, no additional manufacturing expenditure is required in the production of hydrostats for realization of the energy coupling between the hydrostats, and the same is true for the integration of the control block.

The control block is preferably integrated in the connecting block. With corresponding disposition of the individual valve functions, the control block and connecting block can be structured symmetrically. In addition, there is also the possibility to integrate the adjustment or adjustment devices of the hydrounits in the connecting block. This provides the advantage that the connecting block can be arranged without consideration of the connections or design of the connecting sides of the individual hydrounits to the housing end surfaces, that is, the connecting block can also be incorporated, turned by 180°. Another possibility to make the entire unit significantly more compact consists in integration of the housing end parts of the hydrounits in the connecting block.

In the transmission embodiment as disclosed herein, the hydrounits can be disposed in the region of the outer crown of the planetary differential whereby the distance between the axes of the driving and driven shafts of the two hydrounits depends on the size of the planetary differential.

A significant advantage of this embodiment consists furthermore in the fact that the two hydrounits can be combined into a single assembly, which can be premounted, and incorporated into the transmission as a single assembly. For this purpose, two hydrounits are rigidly joined to each other with at least one bridge or transverse bridge. The connection is preferably performed by bridges applied onto the housing. The entire assembly can then be elastically hung in the transmission.

Advantageously, the integration of the hydrostatic part of the transmission into a transmission housing is accomplished together with the mechanical part of the transmission. The high-pressure parts are all integrated in the housing so that in case of leakage, no oil can reach to the outside. The hydrostatic transmission part can be handled and mounted easily in the form of a single assembly. A CHP transmission with two hydrounits oriented according to the invention is characterized by smaller dimensions of the entire transmission, lower noise emission, and lower cost in comparison to CHP units having a conventionally oriented hydrounit.

The magnitude of the distances between the axes of symmetry of the driving and driven shafts of the hydrounits can be minimized, but is always dependent on the structure of the mechanical part of the transmission and on the orientation of the hydrostatic part of the transmission in the total transmission.

A purely hydrostatic transmission in a very compact form can be created according to an aspect of the invention wherein two hydrostatic units are disposed next to one another in such a way that the position of one of the hydrostatic units is obtained by turning the other hydrostatic unit by 180° around an axis which is perpendicular to a plane going through the axes of symmetry of the driving and driven shafts of the hydrounit, and the displacement of which, in the direction of the axes of symmetry is essentially zero, as well as that the connection of the two hydrounits is accomplished with at least one transverse bridge. The drum axes of the individual hydrounits are in one plane. The assembly is characterized by simple and easy handling and can be obtained completely premounted and tested.

Other objects and advantages of the invention will be apparent to those skilled in the art from the following detailed description taken in conjunction with the drawings and the appended claims.

BRIEF DESCRIPTION OF THE DRAWINGS

FIGS. 1a and 1b shows an arrangement of two hydrounits in one assembly according to the invention.

FIGS. 3a to 3c show the structural rearrangement within the total transmission concept according to FIG. 1 with a flanged-on control block.

DETAILED DESCRIPTION OF THE INVENTION

Figure 2:
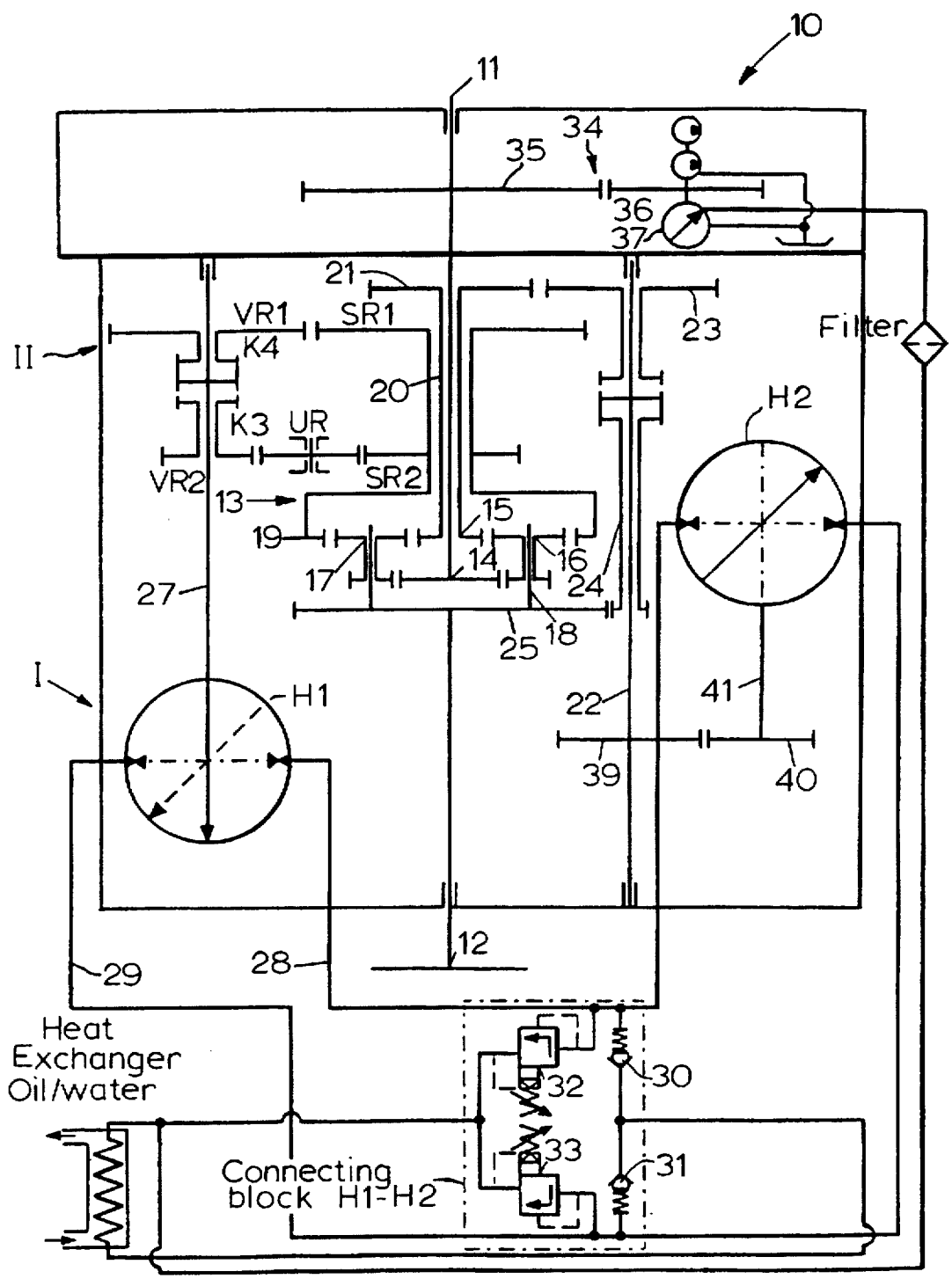
FIG. 2 illustrates schematically an arrangement of the hydrounits in an arrangement in a CHP transmission according to the invention.

FIGS. 1a and 1b shows a preferred embodiment of an arrangement of two hydrostatic units H1 and H2 according to the invention having a slanted-axis structure, and their combination to a single assembly. The two hydrounits H1 and H2, preferably commercially available ones, are disposed in plane E1, as can be seen from FIG. 1b. The plane E1 is determined by the axes of symmetry A1 and A2 of driving and driven shafts of the individual hydrounits H1 and H2.

Preferably, the two hydrounits are similarly designed. Both hydrounits are axially symmetrical with respect to an axis A, which is directed perpendicular to the plane E1, that is, the position of the hydrounit H2 can be described by turning the hydrounit H1 by 180° around the axis A. The position of the axis A is chosen in such a way that both the hydrounits H1 and H2 are disposed directly next to one another without displacement in the direction of the axes of symmetry of their driving and driven shafts. The extensions of these axes of symmetry A1 and A2 of the driving and driven shafts of each of the hydrounits H1 and H2 and the straight lines G1 and G2 drawn through the intersections of the outside contours of the hydrounits with the axes of symmetry, describe a rectangle. Drum axes T1 and T2 of the hydrounits H1 and H2 also lie in a common plane, which is the same as the plane E1, which goes through the axes of symmetry A1 and A2 of the driving and driven shafts of the two hydrounits H1 and H2.

The two hydrounits are coupled to each other through a connecting block including connecting lines, in the embodiment shown in the form of pipelines 3. These are disposed between the two hydrounits H1 and H2. Preferably, the two hydrounits are rigidly joined to a single unit (assembly 8) with at least one cross bridge 7. The cross bridge 7 is joined to the housings of the two hydrounits. The valve functions are integrated into a control block 6. In the embodiments shown here, this control block 6 is disposed on the hydrounit H2 in order to keep the valves accessible from the outside in case they are contaminated. However, it is possible to integrate the control block 6 directly into the pipelines 3.

The entire assembly 8 can be connected to the transmission housing, not shown here, via elastic elements 4, and can be coupled through couplings 5a and 5b to the corresponding shafts, for example, to the shafts of the mechanical transmission part of a CHP transmission.

FIG. 2 shows schematically the arrangement of the two hydrounits in a CHP concept according to an internally made plan. The power division transmission, generally designated 10, consists of a hydrostatic transmission part I, including two hydrounits H1 and H2, which can be operated as a pump and as a motor, and a mechanical transmission part II. A driving machine, not shown, is connected on the side of the transmission input shaft 11. A transmission output shaft of the power division transmission 10 is designated 12. There is a planetary differential 13 disposed between the transmission input shaft 11 and the transmission shaft 12. The differential includes a large sun wheel 14, a small sun wheel 15, double planet wheels 16 and 17, a bridge shaft 18, and a hollow wheel (annulus) 19. The large sun wheel 14 is nonrotatingly connected to the transmission input shaft 11. The small sun wheel 15 is nonrotatingly connected to a hollow shaft 20, on which, again, a toothed wheel (gear) 21 is nonrotatingly disposed. The toothed wheel 21 meshes with a toothed wheel 23 which is disposed on a shaft 22 so that it can rotate. A toothed wheel 39 is nonrotatingly attached to the shaft 22 and meshes with a toothed wheel 40, which is in nonrotating connection with a shaft 41, which functions as the driving or driven shaft of the hydrounit H2. The 22 represents the mechanical connection between the hydrounit H2 and the planetary differential transmission 13, as an intermediate shaft. Furthermore, a toothed wheel 24 can be nonrotatingly connected to the shaft 22 with the aid of a coupling K1, which is engaged with a toothed wheel 25 that is nonrotatingly connected with the transmission output shaft 12. With the aid of a coupling K2, the toothed wheel 23 can be nonrotatingly coupled to the shaft 22.

A spur pinion $SR_1$ and a spur pinion $SR_2$ are nonrotatingly connected with the hollow wheel 19. The spur pinion $SR_1$ meshes with a countertransmission $VR_1$ and the spur pinion $SR_2$ meshes with a countertransmission $VR_2$ through a reverse wheel UR. Both countertransmissions $VR_1$ and $VR_2$, can be coupled optionally with clutches K3 and K4 to a shaft 27, which functions as a driving shaft or a driven shaft of the hydrounit H1.

The hydrounits H1 and H2 are joined together with connecting lines 28 and 29. The hydrostatic coupling of the hydrounit H1 to the hydrounit H2 is done via a control block H1/H2, which includes two check valves 30 and 31 for feeding the amount of oil leaked and two relief valves 32 and 33 to limit the maximum pressure.

The oil is supplied to the hydrounits via a feed pump 37 driven by the driving machine through a spur pinion stage 34, including a spur pinion 35, which is nonrotatingly joined to the transmission input shaft 11, this spur pinion being engaged to a spur pinion 38 which is nonrotatingly joined to the drive shaft 36 of the feed pump 37.

The rate of rotation of the transmission output shaft 12 is the sum of the rates of rotation of the large sun wheel 14 and of the hollow wheel 19, which determine the of rotation of the planet wheels 16 and 17 and of bridge shaft 18.

In a top view, the two hydrounits H1 and H2 are arranged in such a way that their driving and driven shafts 41 and 27 are directed opposite to one another, as a result of which, in contrast to the internal solution, the additional intermediate states 39/40 could be integrated. The advantage of this is that the speed increase ratio to hydrounit H2 can be increased by about 50% without exceeding the limiting rates of rotation of the hydrostats.

Figure 3A:
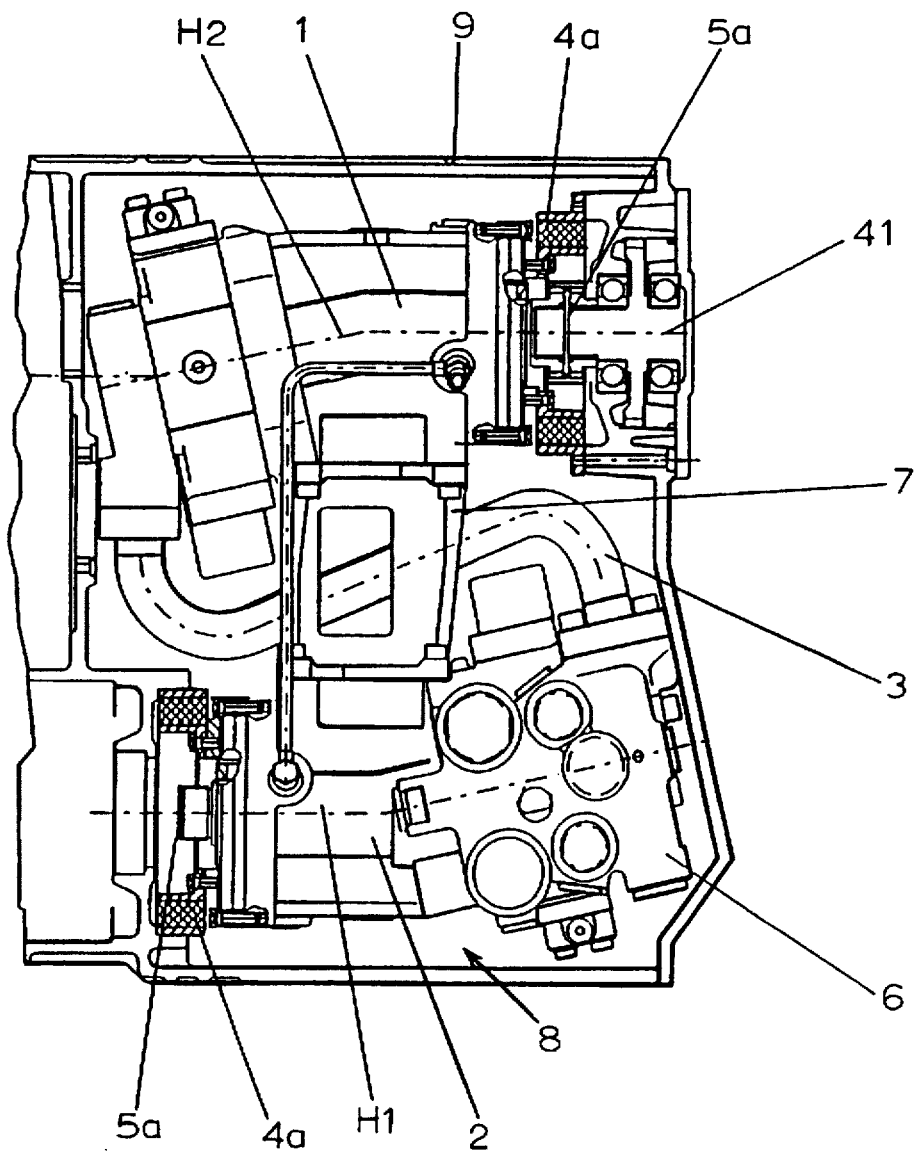
Figure 3C:
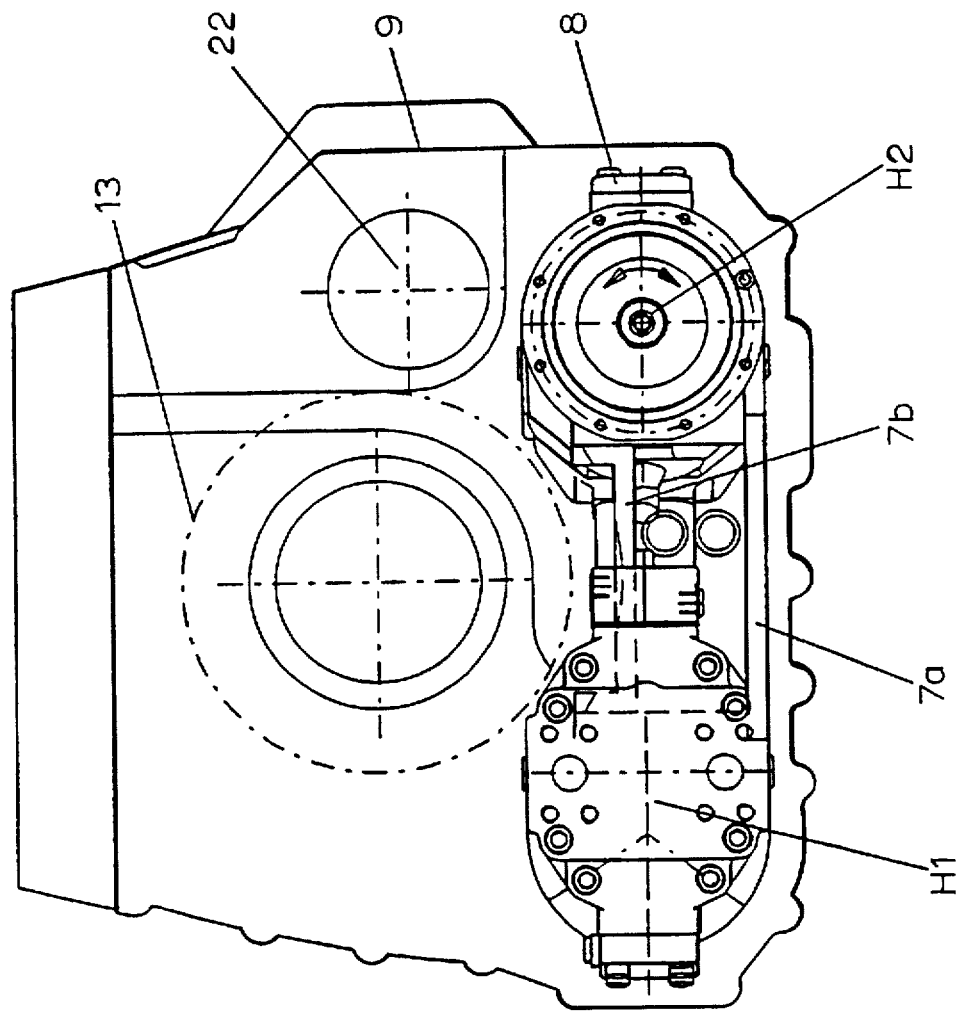

FIGS. 3a–c show a constructive arrangement of the two hydrounits into one assembly 8 according to FIG. 1 in a total transmission concept of a continuous hydrostatic power division transmission according to FIG. 2. Therefore, in the following description, the same reference numbers are used for the same elements.

FIG. 3a shows the arrangement of assembly 8 which was already described in detail in FIG. 1, in a total transmission concept according to FIG. 2 in a top view. However, the mechanical part of the transmission is not shown for the sake of clarity. The hydrounits H1 and H2, which are combined to an assembly 8 with the aid of the transverse bridge 7, are connected to the transmission housing 9 with the aid of the elastic elements 4a and 4b. The mechanical transmission part 1, which is not shown here for the sake of clarity, is also integrated into this transmission housing 9. The hydrounits H1 and H2 are coupled to shafts 27 and 41 through couplings 5a and 5b, which can be designed, for example, in the form of a curved teeth couplings. The hydrounits are coupled to the planetary differential transmission through spur pinions nonrotatingly connected to these shafts, but the spur pinions are not shown here individually.

FIG. 3b shows the top view as shown in FIG. 3a, with the mechanical transmission part drawn in. The hydrounit H2 is disposed below the intermediate shaft 22.

FIG. 3c shows a section through the transmission according to FIG. 3b. It can be seen from this representation that, when the hydrounits are of a small size, there is a possibility to dispose the hydrounits essentially below the outer crown of the planetary differential transmission 13. However, here, only the head circle diameters of the individual elements of the planetary differential transmission are shown. In the embodiment that is illustrated here, the arrangement is accomplished in connection with the arrangement shown in FIG. 3b below the hollow wheel 19 and above the spur pinion 25 connected to bridge shaft 18. This has the advantage that the space required by the mechanical part of the drive does not have to be enlarged in the axial direction as it would be in any embodiment in which the mechanical and hydrostatic transmission parts would be displaced in the axial direction. Both of the hydrounits are disposed in the transmission sump.

Figure 4A:
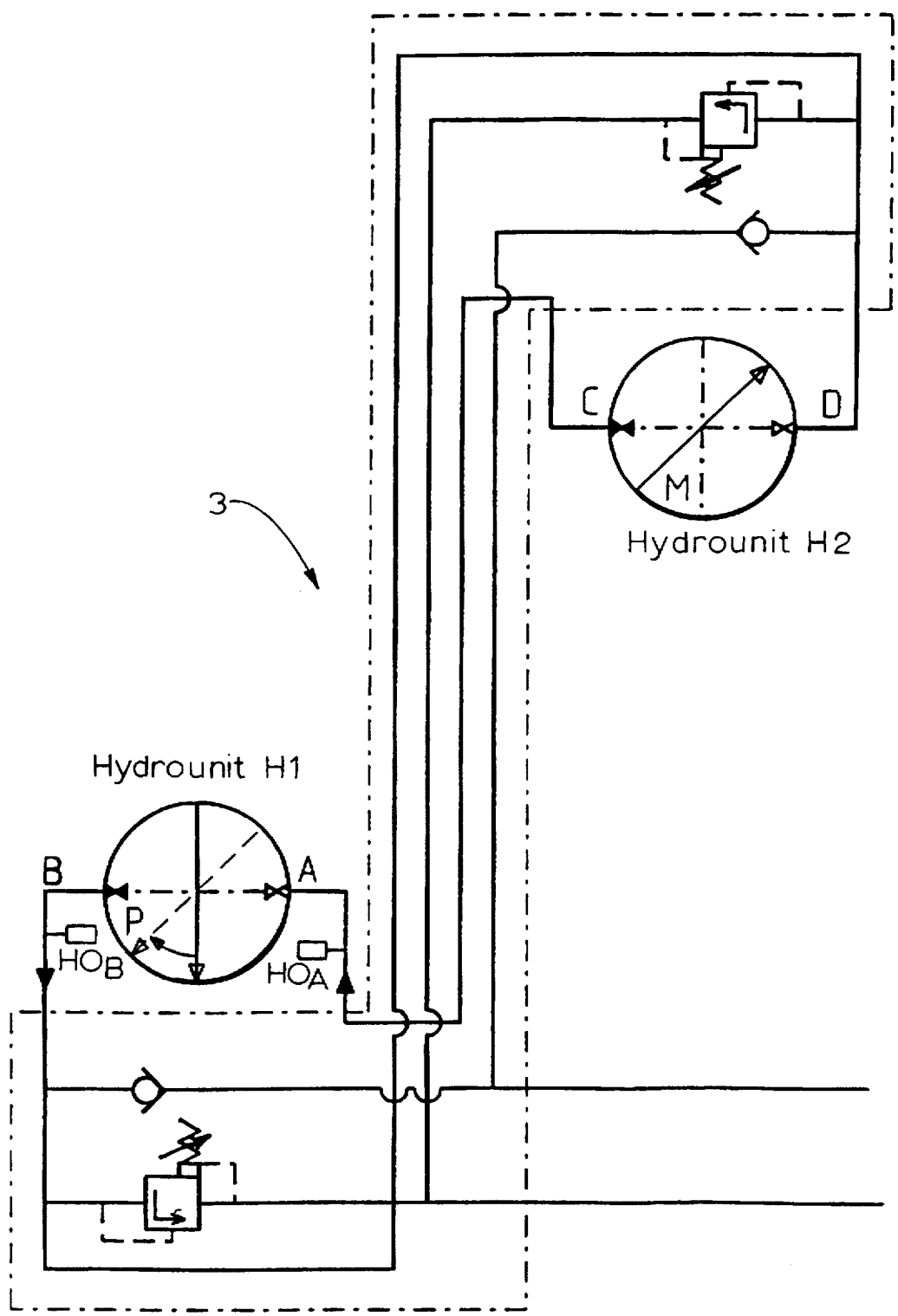
FIGS. 4a to 4c illustrate schematically other possibilities of defining the control block.

FIG. 4a shows schematically, and as an example, the integration of the control block with two pressure limiting valves into the connecting block 3. Preferably, the control block is designed in such a way that a pressure limit valve is assigned to each hydrounit H1 and H2 on the high-pressure side. This provides the advantage that the control block 6, and thus the connecting block 3, can be constructed symmetrically, as a result of which, the control can be disposed on the housing end surfaces of the individual hydrounits without consideration of the connections or the design of the connecting sides.

Figure 4B:
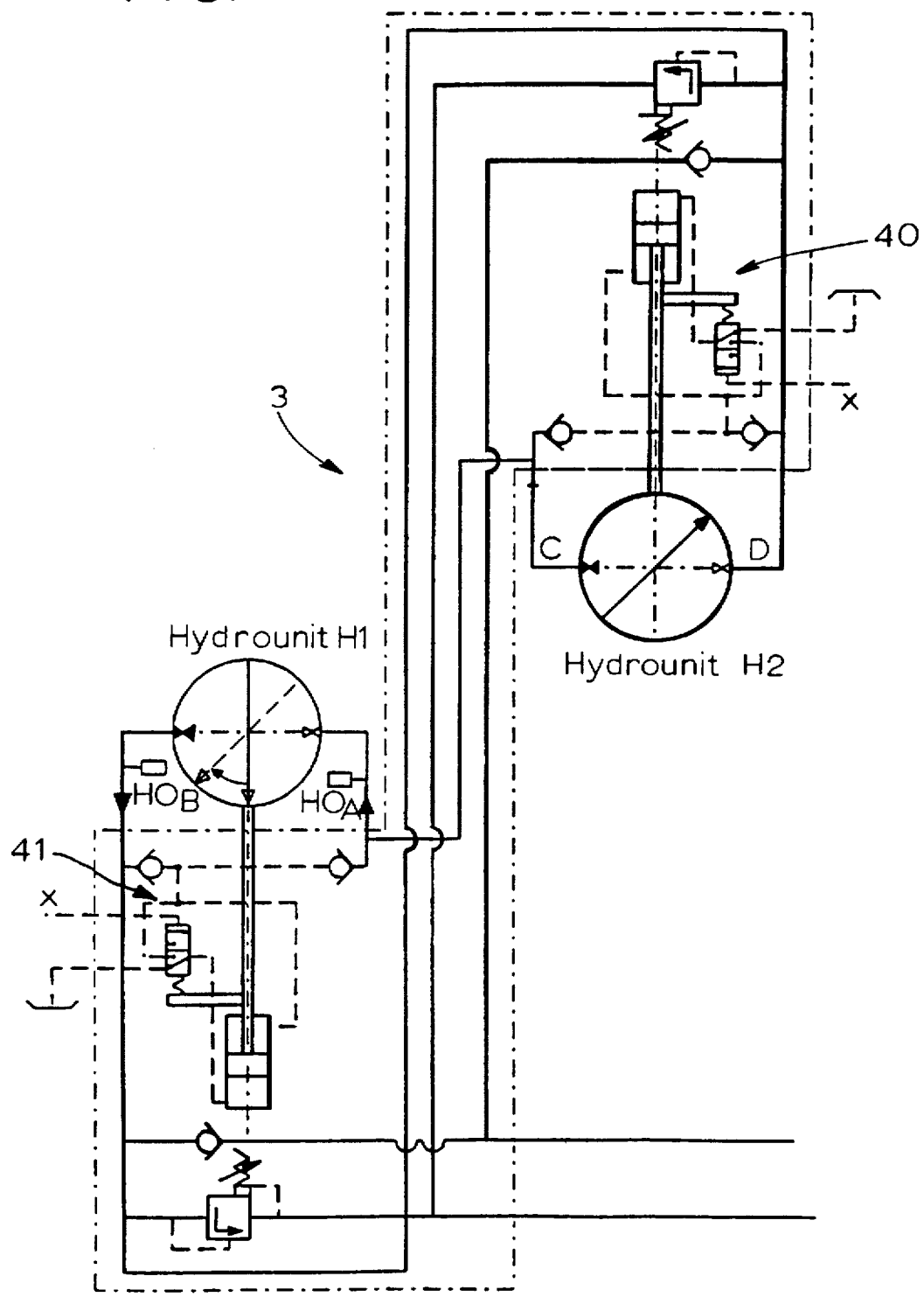

FIG. 4b shows the additional integration of hydrostat adjustments (40, 41) in the connecting block 3, by way of example.

Figure 4C:
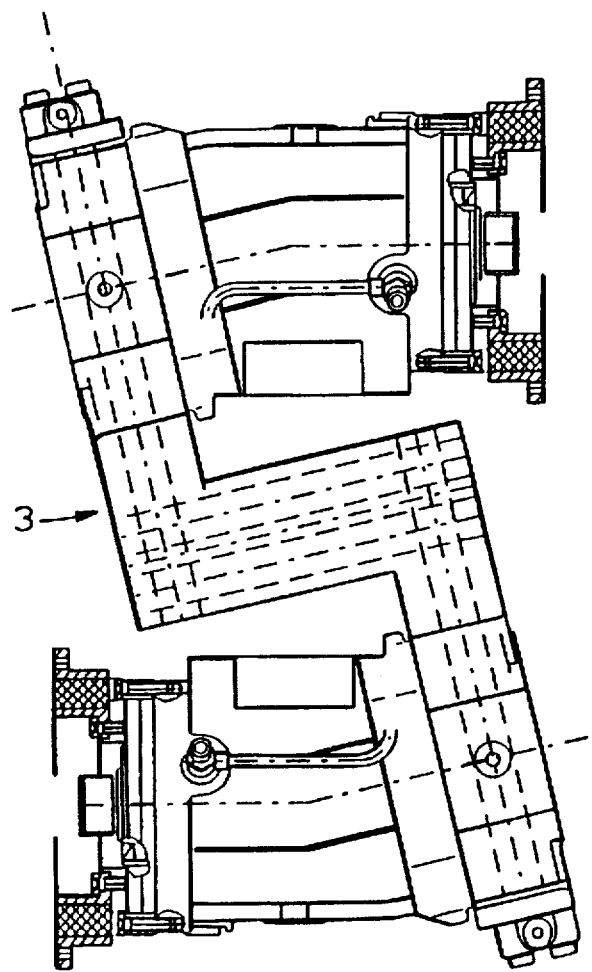

FIG. 4c schematically shows the constructive design in a very simplified form. The connecting block 3 can be flanged onto the end housing of the particular hydrounit H1 and H2. However, it is also possible to integrate the end housing of the hydrostats with the connecting block.

According to another aspect of the invention, the hydrostatic transmissions can also be designed in the form of the assembly described here when the driving and driven shafts are not very far-removed from each other.

I claim:

1. In a continuous hydrostatic-mechanical power division transmission having a mechanical transmission part and a hydrostatic transmission part and wherein (a) the mechanical transmission part comprises a planetary differential transmission having at least two sun wheels of different diameters, a hollow wheel and a bridge shaft upon which nonrotatingly connected double planet wheels are disposed, said double planet wheels meshing with said sun wheels, the large sun wheel being connected to a transmission input shaft and the bridge shaft being connected to a transmission output shaft;

(b) the hydrostatic transmission part comprising first and second displaceable hydrounits energetically coupled with each other, each having a driving/driven shaft, each of said hydrounits operable in two directions as a pump and as a motor, said hydrounits being coupled to the mechanical transmission part;

(c) in individual operating regions, the hollow wheel is coupled to the first hydrounit to control the direction of rotation and the rate of rotation of the transmission output shaft;

(d) in a first operating range, the second hydrounit is in drive connection with the transmission output shaft through a change-over element and the first hydrounit which is connected to the hollow wheel operates as a pump and the second hydrounit operates as a motor;

(e) the hydrounits are disposed in a slanting axis construction;

(f) the driving/driven shaft of the hydrounits run parallel to one another.

2. The improvement of claim 1 wherein:

(a) the hydrounits have the same design and constructional size and are defined by the following characteristics:

(b) the position of the second hydrounit can be defined by rotating the first hydrounit around an axis A by 180°; and (c) a position of the axis A is chosen in such a way that displacement between the two hydrounits in the direction of the axes of symmetry is almost zero.

3. The improvement of claim 1 wherein (a) the hydrounits have extended housing end parts; and (b) each end part is integrated in a connecting block.

4. The improvement of claim 1 wherein a control block is integrated into a connecting block between the two hydrounits.

5. The improvement of claim 4 wherein (a) the control block includes at least first and second pressure control valves; and (b) one of said pressure control valves is assigned to each hydrounit on a high-pressure side thereof.

6. The improvement of claim 4 wherein the connecting block is substantially symmetrical.

7. The improvement of claim 1 further comprising displacing devices of the hydrounits being integrated in the connecting block.

8. The improvement of claim 4 wherein the control block is flanged on a housing of at least one of the hydrounits.

9. The improvement of claim 1 wherein the two hydrounits fit in a position in a region of an outer crown of the planetary differential transmission.

10. The improvement of claim 1 wherein the two hydrounits are rigidly connected to each other forming a structural unit.

11. The improvement of claim 10 wherein the connection of the hydrounits is provided by at least one transverse bridge which is linked to a housing of each hydrounit.

12. The improvement of claim 10 wherein the structural unit is elastically hung in a transmission housing.

13. The improvement of claim 1 wherein (a) in the first operating range and in a second operating range , the two hydrounits run opposite to one another in a range between minimum and maximum, and when changing from the first to the second operating range and vice versa, the hydrounits exchange function;

(b) the hollow wheel can be coupled with the driving/driven shaft of the first hydrounit with the aid of a second change-over element optionally through at least one of a first toothed wheel drive and a second toothed wheel drive;

(c) the first toothed wheel drive being built for coupling to the hollow wheel to the first hydrounit through the first toothed wheel drive, the hollow wheel and the driving/driven shaft of the first hydrounit rotate in the opposite direction; and (d) the second toothed wheel drive is built for coupling with the first hydrounit, the hollow wheel and the driving or driven shaft of the hydrounit rotate in the same direction.

* * * * *